United States Patent
De Castro

(10) Patent No.: US 9,810,810 B2
(45) Date of Patent: Nov. 7, 2017

(54) SYSTEM AND PROCESS TO DESCRIBE VERTICAL SEQUENCES OF ROCKS USING GESTURES

(71) Applicant: LHB SOLUçÕES EM INFORMAçÕES E MÉTODOS LTDA., Porto Alegre (BR)

(72) Inventor: Eduardo Studzinski Estima De Castro, Rio de Janeiro (BR)

(73) Assignee: LHB SOLUçÕES EM INFORMAçÕES E MÉTODOS LTDA., Porto Alegre (BR)

( * ) Notice: Subject to any disclaimer, the term of this patent is extended or adjusted under 35 U.S.C. 154(b) by 331 days.

(21) Appl. No.: 14/686,861

(22) Filed: Apr. 15, 2015

(65) Prior Publication Data

US 2015/0317052 A1 Nov. 5, 2015

(30) Foreign Application Priority Data

May 2, 2014 (BR) .......................... 10 2014 010601

(51) Int. Cl.
*G06F 3/048* (2013.01)
*G01V 99/00* (2009.01)
(Continued)

(52) U.S. Cl.
CPC ........ *G01V 99/005* (2013.01); *G06F 3/04817* (2013.01); *G06F 3/04883* (2013.01); *G01V 2210/66* (2013.01)

(58) Field of Classification Search
CPC combination set(s) only.
See application file for complete search history.

(56) References Cited

U.S. PATENT DOCUMENTS 6,816,787 B2 * 11/2004 Ramamoorthy ....... G01V 11/00
  702/7
8,385,604 B2   2/2013 Orpen
(Continued)

FOREIGN PATENT DOCUMENTS

WO   2010148435 A1   12/2010

OTHER PUBLICATIONS

Abel et al., "Lithologic Logs in the Tablet through Ontology-based Facies Description", Search and Discovery Article #40924, 2012, pp. 1-18.
(Continued)

*Primary Examiner* — Hien Duong
(74) *Attorney, Agent, or Firm* — Carter, DeLuca, Farrell & Schmidt, LLP

(57) ABSTRACT

The disclosure relates to the fields of geology and geotechnics, and to a system for description of vertical sequences of rocks in cores and outcrops. The system and process provide a way to describe vertical sequences of rocks in digital media through gestures on a device equipped with a touchscreen. The process allows inserting data simply and quickly and uses a geological feature vocabulary and a library of standardized icons, an aspect that eliminates the heterogeneity of the data obtained in diverse descriptions and allows analyzing the captured data automatically by computer. The benefits include, but are not limited to: elimination of vocabulary heterogeneity and description formats of vertical sequences of rocks; generation of customized reports; data export to files with standardized formats for data exchange among software applications; reduction of the time used in the description; reduction of the time used to generate technical reports.

27 Claims, 4 Drawing Sheets

System columns for describing vertical sequences of rocks on cores and outcrops

(51) Int. Cl.
G06F 3/0488 (2013.01)
G06F 3/0481 (2013.01)

(56) References Cited

U.S. PATENT DOCUMENTS

| | | | | |
|---|---|---|---|---|
| 2007/0061079 A1* | 3/2007 | Hu | ............ | E21B 47/04 702/6 |
| 2009/0271116 A1* | 10/2009 | Norris | ............ | E21B 49/00 702/11 |
| 2011/0320182 A1* | 12/2011 | Dommisse | ............ | G01V 1/34 703/10 |
| 2013/0297272 A1* | 11/2013 | Sung | ............ | G01V 1/306 703/10 |
| 2014/0081613 A1* | 3/2014 | Dommisse | ............ | G01V 1/345 703/10 |
| 2015/0279093 A1* | 10/2015 | Sung | ............ | G06T 17/05 345/420 |
| 2015/0317052 A1* | 11/2015 | De Castro | ............ | G01V 99/005 715/769 |

OTHER PUBLICATIONS

"Strataledge by Endeeper", found at https://play.google.com/store/apps/details?id=com.endeeper.strataledge, Jan. 2015, pp. 1-2.
"Strataledge by Endeeper", found at http://www.endeeper.com/product/strataledge, Dec. 2015, pp. 1-7.

* cited by examiner

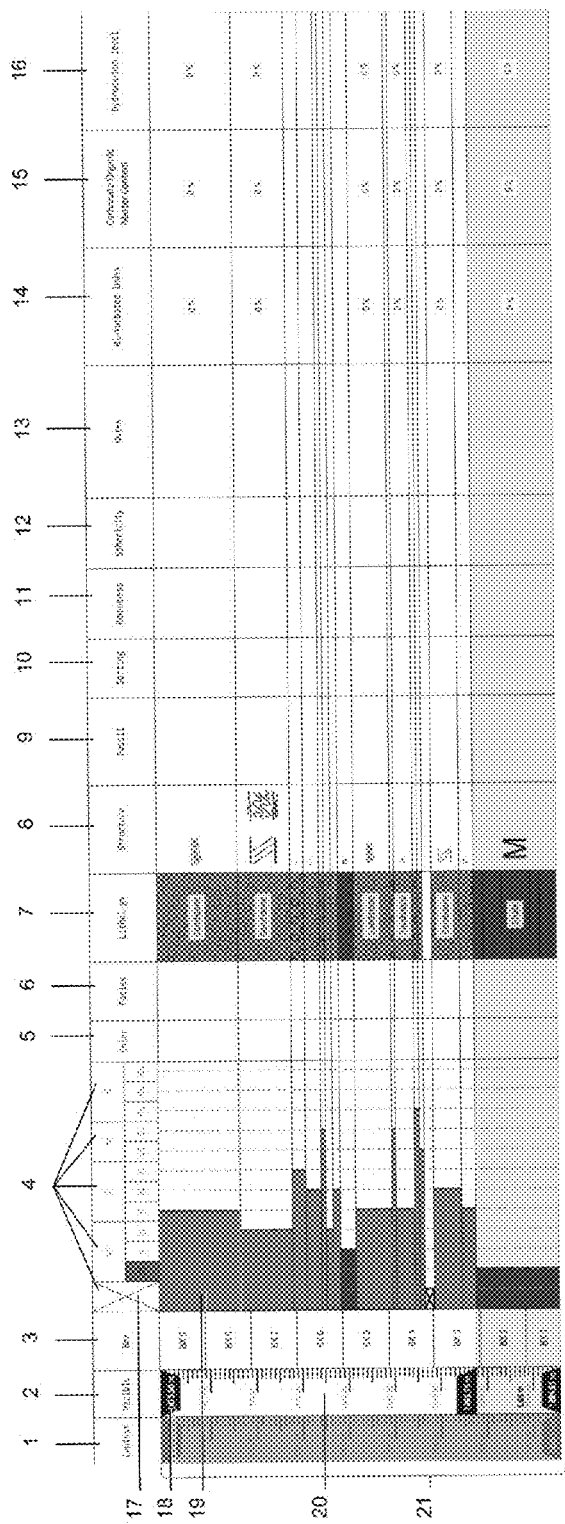
Figure 1 - System columns for describing vertical sequences of rocks on cores and outcrops

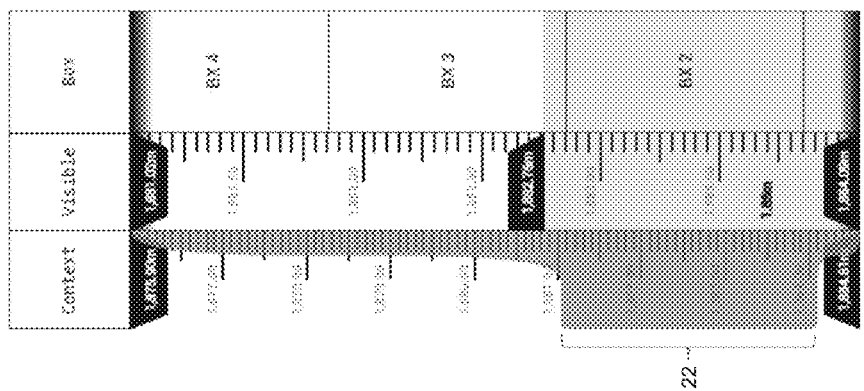
Figure 2 - Vertical and partial graphical scale description

Figure 3 - Example of a list of attribute values

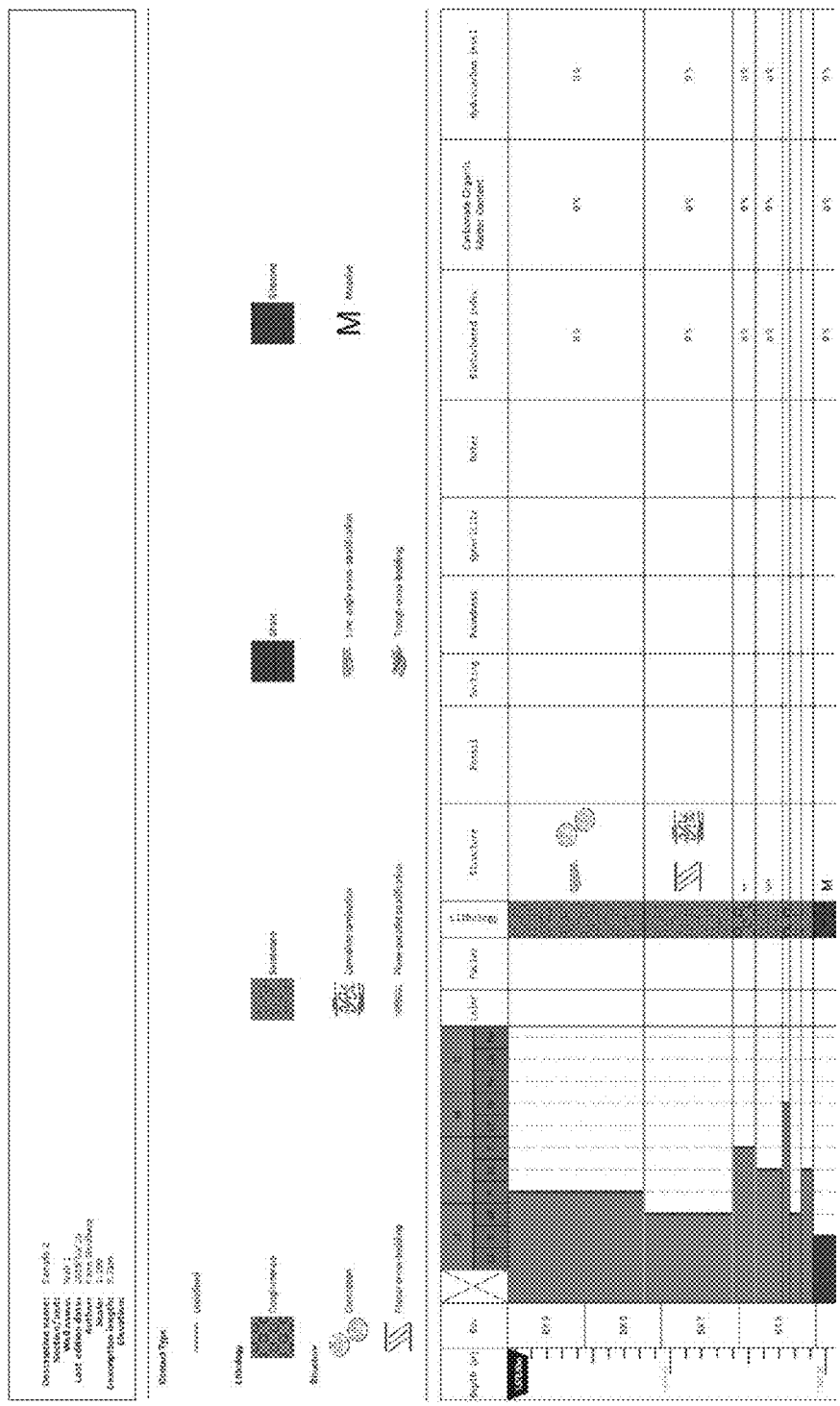
Figure 4 – Type of report generated by the system

SYSTEM AND PROCESS TO DESCRIBE VERTICAL SEQUENCES OF ROCKS USING GESTURES

FIELD OF THE INVENTION

This invention, in general, belongs to the geological and geotechnical fields, and refers more specifically to a system for description of vertical sequences of rocks in cores or outcrops.

BACKGROUND

The subsurface drilling operations are extremely important in order to efficiently investigate the rock elements that form a terrain. For so, vertical sequences of rocks exposed on the surface, which are named outcrops, are described, or rock cores extracted from wells drilled for research, or mineral or oil exploration. These descriptions are performed by geologists, who generally take notes on paper, in the areas where the core or outcrop is, normally far from locations with technology infrastructure. Then, these notes are transferred to a digital format, usually through desktop computers in offices or laboratories with computer systems guided by a designer, and sets of geological image libraries to be selected by the user. This is the case of CAD systems (Computer Aided Design, which are graphic support systems for projects). The purpose of this transfer is only for faster graphical reporting and the preservation of the drawings and notes. Examples of such systems are WellCAD (developed by Advanced Logic Technology) and StrataBugs (developed by StrataData).

In addition to these, there are systems to elaborate designs on multi-touch screens, allowing the geologist to perform his own notes and drawings in digital media. These systems, which also fall into the CAD category, are, for example, Sketchbook (developed by AutoDesk) and ArtRage (developed by Ambient Design). Both are used to produce drawings and are not specific systems for Geosciences.

Therefore, one can evidence that, besides the use of drawing systems for vertical sequences of rocks, human processing is required, i.e., the information generated are drawings that can only be interpreted by people. The difference between the files generated by the abovementioned systems and handmade drawings is just the storage media: paper vs. digital. The limitation of the existing approaches is that the information generated cannot be interpreted and automatically extracted by computers, because in the current state of the art, computers cannot see or interpret drawings. Current approaches produce a large amount of data, with high capture cost and low use potential by the industry. It is still worth mentioning that the current systems do not systematize the vocabulary of geological feature descriptions to obtain correlated descriptions, even when performed by different geologists. The heterogeneity of the vocabulary of geological feature descriptions hinders the development of computational methods for computer processing and automatic interpretation of the generated data.

Thus, for an effective and an efficient descriptive data capture of vertical sequences of rocks, several technologies have been developed, and two patents may be cited. The American patent U.S. Pat. No. 8,385,604 B2 describes a combination of digital camera and desktop computer that uses a system to describe rock cores. In this system, the operator must enter through a keyboard and mouse all the information related to the sample, which is also photographed. From the two-dimensional image, a virtual three-dimensional model of the sample core is generated. Another patent, Australian WO2010148435 A1, presents a combination of digital camera and desktop computer, as above, but it includes a base for positioning the sample and sensors for its measurement.

As mentioned above, both patents have the disadvantages of only accelerating the process to obtain images and to describe cores, without a standardization of the generated data. In both cases, the captured data are images that require human processing, and allow free annotations. Similarly to the CAD examples, the only difference between the handmade drawings and those generated by these systems is the storage media. These solutions do not also standardize the vocabulary used in the description, even when made by only one geologist, which hinders the development of computational methods capable of interpreting the data generated subjectively, requiring human analysis, making the processing more susceptible to errors.

Based on the above, we can notice a gap in the description process of vertical sequences of rocks. In all current processes, there is no standardization of the vocabulary of geological features and of the data input forms in the digital environment, using the mouse and keyboard as interaction resources, making impossible to use automatic interpretation and correlation methods for the generated data.

SUMMARY

Intending to fill the gaps presented in the current state of art, this invention defines a process to generate the digital description of vertical sequences of rocks, using gestures in a multi-touch system, which includes the standardization of multilingual vocabulary geological features, controlled by an ontology and a set of icons. The invention allows describing vertical sequences of rocks of outcrops and cores of oil and mineral exploration wells with the possibility of automatic interpretation by computers.

The scope of this report consists of a description system of vertical sequence of rocks, capable of recognizing gestures on touchscreen devices, such as tablets, which can be taken to the field to describe faster and simpler the vertical sequences of rocks. The description system of vertical sequence of rocks has as inputs gestures performed in a multi-touch device and it is capable of generating reports and drawings with standardized vocabulary and data that can be interpreted by computer.

The presented invention patent differs from the other forms of description because it is a digital method to describe vertical sequences of rocks and it can be performed at the time of the analysis and where the core or outcrop is, since it is a portable device, and, using gestures on a multi-touch screen, making the interaction between the user and the system much easier and the record much faster. And for using a formal domain ontology as library, composed by a propositional, multilingual and iconic vocabulary.

BRIEF DESCRIPTION OF THE DRAWINGS

For this invention to be fully understood and put into practice by any technician of this technological sector, below is a clear, concise and sufficient, illustrated description subsidized by figures herein and attached.

FIG. 1 shows the system with all columns for describing vertical sequences of rocks on cores and outcrops.

FIG. 2 is a partial and vertical graphical scale of the description.

FIG. 3 shows an example of a list of attribute values.

FIG. 4 shows one of the types of reports generated by the system.

DETAILED DESCRIPTION

This invention basically consists of a system and a process to obtain the detailed description of rock cores in digital medias.

FIG. 1 presents the description record area. Each horizontal line of the area indicated by the horizontal continuity (19) is the basic unit of information input. Such rows can be inserted dynamically, according to user's criterion and need. Following each column, from 4 to 16, the user records the geological information regarding the basic information unit. In these columns, the information is registered by selecting standardized vocabulary and icons, available in a system library, or the user's free input. The "Box" column (3) allows registering information regarding the physical location of the rock samples, which are the basis to enter information recorded in the basic information units. The "Visible" column (2) registers and shows the depths corresponding to the basic information units (20). The "Context" column (1) allows the user to control the description portion to be viewed. With this, the user navigates vertically in the description or dynamically changes the vertical graphical scale of the description. In FIG. 1, the "Context" column (1) indicates that the user is viewing the entire description (21). FIG. 2 (22) indicates that the user changed the vertical graphical scale and is viewing only the lower part of the description. The information registered in the area indicated in FIG. 1 is obtained through gestures applied on the touchscreen device, with multi-touch capability and guided by standardized icons and vocabulary, allowing automatic interpretation by computer of the inputted data.

The proposed solution also allows through a set of interaction gestures based in multi-touch faster data capture and search, with shorter and simpler commands to perform fewer interactions. In addition, it allows performing the description directly with the occurrence of the vertical sequence of rocks, using gestures on multi-touch screens and transferring to different computers, linked to a complete set of controlled vocabulary of geological features and associated icons, serving as a library to be selected by the user. Finally, the solution allows description data to be reproduced in different types and models of digital reports. In particular, to create a description of a vertical sequence of rocks in the presented system, it is necessary to use equipment with touchscreen.

The core description process using the system and device with touchscreen starts by touching the System icon. Then, a window opens, divided in new and existing descriptions. Touching the new description icon, opens a new window with specific fields to enter the start and final depths of the core, which must be recorded in numerical format from a digital keyboard available. After entering these data, a new window opens to perform the description itself. FIG. 1 shows the window with all available columns.

By touching the "Visible" column (2), you can enter a new interval, through an available digital keyboard. By opening and closing two fingers on the "Context" column (1), you can change the zoom, allowing viewing the interval in more or less detail. This same action can be performed in the data area of any of the columns (4) to (16).

At the beginning of the description, choose the type of rock in the interval to be described. With a touch on the "Lithology" column (7) a list of attribute values to be selected opens. If the desired rock classification is not listed, you can, with a long touch on the "Particle Size" column (4) change the rock classification. After choosing the lithology, the particle size is entered by touching the bottom or top of the box (19) and dragging to the approximate size of the desired interval and particle size.

It is possible to horizontally scroll the screen to view the other columns of attributes, touching with one or two fingers on any of the columns (4) to (16) and laterally slide the fingers.

Figure 3:
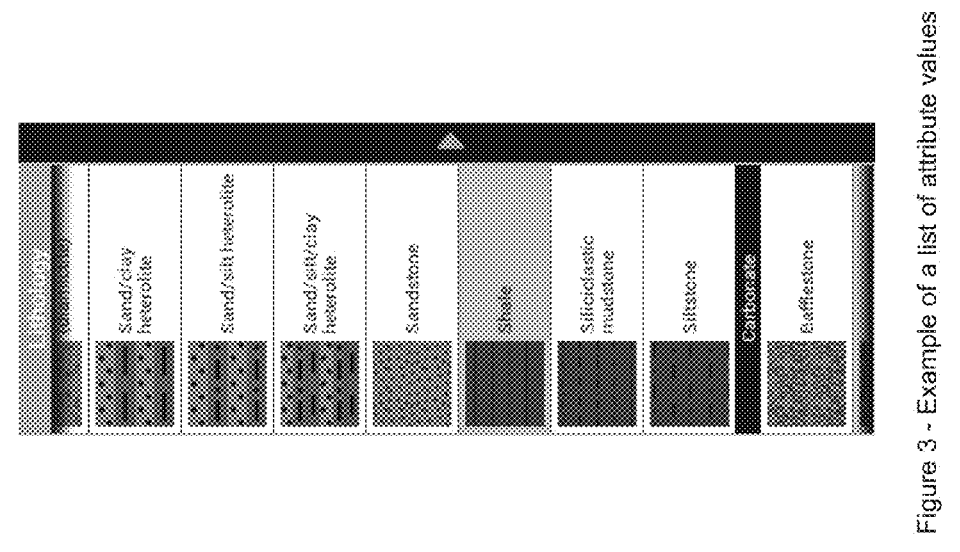

The "Lithology" (7), "Structure" (8), "Color" (5), "Fossil" (9), "Sorting" (10), "Roundness" (11) and "Sphericity" (12) columns are filled with a touch followed by the choosing an attribute value, available in specific lists for each item, as shown in the example in FIG. 3. If you need to change the value of the attribute already inserted, you must touch it in the interval, select its exclusion and repeat the selection of a new value. In the "Structure" column (8), the primary and secondary structures must be selected, inserted in that order. You can also set the main structure with a long touch on the desired option in the attribute value list, causing it to take the place of the former main structure.

A touch on the "Notes" column (13) opens a virtual keyboard, with which you can enter notes or comments. The "Carbonate Organic Matter Content" (15), "Bioturbated Index" (14) and "Hydrocarbon Level" (16) columns are filled touching and vertically dragging your finger on the ruler that represents a scale, preferably from 0% to 100%, until the desired value is reached.

Before inserting a new interval, you must set a contact between the first interval and the latter, by a touch on the line that borders the top of the first. Then a list of contacts appears to select the value that represents the desired contact.

After the description of the first interval, you can enter a new interval by selecting an area not yet described in the "Particle Size" (4) column with a touch, and then dragging it, drawing the interval limit and the particle size, simultaneously. Still optionally, the area can be filled by touching the "Particle Size" (4) column and then touching the detail ruler (20), at an approximate depth of the interval limit.

It is also possible to delete a contact between two intervals with a long touch on it, which makes the entire adjacent interval to be deleted as well. The same procedure can be performed to delete an interval. That is, with a long touch on the detail rule (20) in the area of the interval the desired deletion is performed. Its limits, however, are preserved.

It is still possible to indicate when there is no lithology material to be described at a certain depth, that is, when there is an interval without recovery. To do this, you must enter an interval by touching and dragging your finger over the "Particle Size" column (4), positioning the limit on the interval area without recovery (17).

As new intervals are inserted and a larger area is needed to fully view the core data, you can move the screen vertically. Thus, touching with two fingers in any region of columns (4) to (16) of the touchscreen and dragging it up or down, you can view all the data already entered in the system. In addition, you can view the data by placing a finger on the "Context" (1) column and scrolling the screen up or down. You can also resize an already described interval: with a touch on the interval region on the detail scale (20), a new screen opens to insert the new depth through a digital keyboard.

In the "Facies" column (6), with a touch, you can enter a code for each interval using a digital keyboard. In the "Box" column (3) information of the boxes that keep the cores is inserted. A touch on the desired box allows adjusting its limits. To edit the code of each box, you must select the entire "Box" column (3) with a touch on its index. A second touch on the desired box modifies the code with a digital keyboard.

After completing the description, it is possible to generate a report in text and tabular formats, for their better viewing. You can also export the description data to be automatically interpreted by computers. In addition, you can change the data and issue new reports in a simple and dynamic way. The user just needs to change the data in the desired fields. With these resources, time is optimized to elaborate reports and interpret the processed information and the description of rock cores is faster.

We herein dealt with a system and process to describe vertical sequences of rocks in cores or outcrops through gestures on a touchscreen device, using geological feature vocabulary and standard icons, and they present innovation, inventive activity and industrial application, and thus, they have the essential requirements to grant the claimed privilege.

The invention claimed is:

1. A process to describe vertical sequences of rocks using gestures, comprising:
    using a device with touchscreen, gesture recognition and multi-touch support to open a system that provides standardized vocabulary and icons, digital keyboard and the following columns: Context (1), Visible (2), Box (3), Particle Size (4), Color (5), Facies (6), Lithology (7), Structure (8), Fossil (9), Sorting (10), Roundness (11), Sphericity (12), Notes (13), Bioturbated Index (14), Organic Matter Content (15) and Hydrocarbon Level (16):
    selecting new description;
    entering a total length of a sample of vertical sequences of rocks;
    inserting initial and final depths of the sample of vertical sequences of rocks;
    inserting a new interval in a Visible column (2);
    choosing a type of rock in a Lithology column (7);
    inserting a particle size in a Particle Size column (4);
    inserting a type of rock structure in a Structure column (8);
    inserting a rock color in a Color column (5);
    inserting types of fossil in a Fossil column (9);
    inserting data in a Sorting column (10);
    inserting interval roundness in a Roundness column (11);
    inserting interval sphericity in a Sphericity column (12);
    inserting contents of organic matter present in a sample in an Organic Matter Content column (15);
    inserting bioturbation index in an interval in a Bioturbated Index column (14);
    inserting a hydrocarbon level in an interval in a Hydrocarbon Level column (16);
    inserting notes in a Notes column (13);
    inserting a code for an interval in a Facies column (6);
    changing a box size and a code where a sample is in a Box column (3);
    inserting a contact between intervals;
    optionally, inserting a new interval and repeating the whole process; and generating a report for data analysis.

2. The process to describe vertical sequences of rocks using gestures according to claim 1, further comprising opening the system with a touch on its icon.

3. The process to describe vertical sequences of rocks using gestures according to claim 1, wherein the steps of entering the total length of the sample of vertical sequences of rocks and initial and final depths of the sample of vertical sequences of rocks are performed out on a digital keyboard.

4. The process to describe vertical sequences of rocks using gestures according to claim 1, wherein the insertion step of a new interval comprises inserting by touching a detail ruler and typing its measure on a digital keyboard.

5. The process to describe vertical sequences of rocks using gestures according to claim 1, further comprising inserting a new interval with a touch on an empty area in the Particle Size column (4) and dragging to an approximate size of a desired interval and particle size.

6. The process to describe vertical sequences of rocks using gestures according to claim 1, wherein the choosing step includes choosing lithology with a touch on an area in the Lithology column (7), followed by a touch on a desired option from a list of available attributes.

7. The process to describe vertical sequences of rocks using gestures according to claim 1, further comprising changing rock classification and types of lithology, available with a long touch on an interval area in the Particle Size column (4), and then choosing a new classification in an available list.

8. The process to describe vertical sequences of rocks using gestures according to claim 1, wherein the step of inserting the particle size comprises inserting the particle size with a touch on a particle size scale in an interval area, followed by dragging until a desired particle size.

9. The process to describe vertical sequences of rocks using gestures according to claim 1, wherein the steps of inserting data in the Structure (8), Fossil (9), Sorting (10), Roundness (11) and Sphericity (12) columns comprises touching an interval area in a desired column, followed by touching an attribute value in an available list.

10. The process to describe vertical sequences of rocks using gestures according to claim 1, further comprising choosing a primary structure and secondary structures.

11. The process to describe vertical sequences of rocks using gestures according to claim 1, wherein a main structure is chosen first.

12. The process to describe vertical sequences of rocks using gestures according to claim 1, further comprising changing a primary structure with a long touch on a desired structure in an available list of attribute values.

13. The process to describe vertical sequences of rocks using gestures according to claim 1, wherein the insertion of data in the Organic Matter Content (15), Bioturbated Index (14) and Hydrocarbon Level (16) columns include touching and dragging an interval area in a desired column and selecting a desired value on a scale.

14. The process to describe vertical sequences of rocks using gestures according to claim 13, wherein the scale comprises an interval from 0% to 100%.

15. The process to describe vertical sequences of rocks using gestures according to claim 1, further comprising allowing inserting notes on an interval by touching an area of a desired interval in the Notes column (13) and describing the note on an available digital keyboard.

16. The process to describe vertical sequences of rocks using gestures according to claim 1, further comprising allowing inserting codes for each interval with a touch on an area of a desired interval in the Facies column (6), and writing on an available digital keyboard.

17. The process to describe vertical sequences of rocks using gestures according to claim 1, wherein the changing of the box size includes performing with a touch on a desired box by inserting its size with a digital keyboard.

18. The process to describe vertical sequences of rocks using gestures according to claim 1, further comprising changing a name of the box with a touch on an index of the Box column (3) by selecting with a touch on the box to be changed and inserting the name with a digital keyboard.

19. The process to describe vertical sequences of rocks using gestures according to claim 1, further comprising inserting a contact between two intervals by touching a division line between the two intervals in the Particle Size column (4) and selecting a desired contact in a list of available attribute values.

20. The process to describe vertical sequences of rocks using gestures according to claim 19, further comprising deleting the contact between the two intervals with a long touch on the desired contact.

21. The process to describe vertical sequences of rocks using gestures according to claim 1, further comprising deleting an attribute with a quick touch.

22. The process to describe vertical sequences of rocks using gestures according to claim 1, further comprising deleting an interval with a long touch on a detail rule in a desired range region.

23. The process to describe vertical sequences of rocks using gestures according to claim 1, further comprising indicating an interval without rock sample by touching and dragging a particle size scale and positioning its limit in an area of the interval without rock sample.

24. The process to describe vertical sequences of rocks using gestures according to claim 1, further comprising changing a view zoom when opening and closing two fingers on the Context column (1).

25. The process to describe vertical sequences of rocks using gestures according to claim 24, wherein changing the view zoom comprises changing the view zoom when opening and closing two fingers on any column from the Particle Size column (4) to the Hydrocarbon Level column (16).

26. The process to describe vertical sequences of rocks using gestures according to claim 1, further comprising moving a screen of the system horizontally and vertically by touching with one or two fingers on any area of the screen and dragging it to a desired direction.

27. The process to describe vertical sequences of rocks using gestures according to claim 26, wherein the moving step includes moving the screen of the system vertically by touching and dragging the Context column (1).

* * * * *